April 8, 1958  J. G. LANDRY  2,830,270
WATTHOUR METER LIGHT LOAD PLATE
Filed April 22, 1954  2 Sheets-Sheet 1

Inventor:
Joseph G. Landry
by, Richard E. Hosley
His Attorney

April 8, 1958     J. G. LANDRY     2,830,270
WATTHOUR METER LIGHT LOAD PLATE

Filed April 22, 1954                                  2 Sheets-Sheet 2

Inventor:
Joseph G. Landry
by, Richard E. Hooley
His Attorney

United States Patent Office 2,830,270
Patented Apr. 8, 1958

2,830,270

WATTHOUR METER LIGHT LOAD PLATE

Joseph G. Landry, Rochester, N. H., assignor to General Electric Company, a corporation of New York Application April 22, 1954, Serial No. 424,808

5 Claims. (Cl. 324—138)

This invention relates generally to improvements in watthour meters and more particularly to an improved light-load compensating device for an induction watthour meter.

Such watthour meters may have their current and potential electromagnets arranged on opposite sides of a rotatable induction disc, and in one form thereof the coil of the current electromagnet may be wound upon a pair of core members whereas the coil of the potential electromagnet may be wound upon a single core member. These core members are usually made up of a group of laminations, and the entire core structure, including return and auxiliary magnetic paths, is usually manufactured as one assembly and, with the current and potential windings in place, is normally referred to as the meter stator. Such stators may have an air gap separating the current and potential sections thereof, and an induction disc rotates in this air gap in response to the torque developed by the magnetic fluxes generated by the current and potential electromagnets.

These meters are normally produced by mass production methods, and it has been found that such methods produce meters varying slightly from unit to unit within permissible manufacturing tolerances. Furthermore, to achieve the highest possible accuracy compatible with minimum manufacturing costs, it has been found desirable to equip such meters with so-called light load torque correcting devices whereby slight deviations arising in manufacture can be compensated for during calibration of the meter prior to shipment. Such deviations can include slight variations in friction, deviations from symmetry, and the like. Moreover, there may be some lack in linearity of driving torque with respect to load current. All of these factors normally have negligible effect at meter full load but may introduce appreciable errors at light loads. Hence, the need for an effective correctional device.

In the past, it has been found that a plate of electrically conducting material, stamped and punched out to form a single short-circuited turn or conducting loop, could be effectively used to achieve proper light-load compensation. Such plates were mounted immediately beneath the central core section of the potential electromagnet in such a way that the flux generated by the potential electromagnet could be slightly distorted thereby. By making the plates adjustable with respect to the potential electromagnet, enough control could be achieved to provide a range of compensating action sufficient to furnish all normal light load correction required. Considering light load as being 10 percent of rated load (rated load being expressed in terms of so many amperes, as 5, 10, 15, etc.), it is customary to provide a light load adjustment capable of a range effect in the amount of 20 percent of light load. In other words, the light load plate should be capable of correcting the meter reading through the range of 80 percent to 120 percent of light load.

Considering the ratio of potential flux density to current flux density, being about 40 to 1 at light load in a typical meter and falling to about 4 to 1 at rated load, and falling still further to about 1 to 1 at 400 percent rated load, and bearing in mind that the control torque for proper light load adjustment is due to potential coil flux alone, it is obvious that the light load plate will exert its strongest influence at 10 percent load, falling to a 2 percent range effect at rated load (98 percent to 102 percent) and falling still further to 0.5 percent at 400 percent rated load (99.5 percent to 100.5 percent). Although the effect of the light load plate is correctional at 10 percent load, it can be an error at rated loads and above, but since its effect diminishes at these loads, satisfactory meter performance is achieved, particularly when the rated meter load does not exceed 15 amperes.

The light load plate is usually mounted coaxially with respect to the potential core structure, being movable to one side of the axis or the other to effect correction. Now considering such an arrangement in combination with a pair of current cores symmetrically arranged about the axis of the potential core, it is apparent that any displacement of the light load plate, with respect to the current cores, will cause the plate to shade one current core more than it shades the other, giving rise to a shading coil effect and introducing an undesirable error torque on the induction disc. With meters rated at 15 amperes and less, this shading effect is not objectionable, as the error torque is usually not sufficient to cause any significant change in meter registration. However, as the rated load of the meter increases to 50 amperes, with a 400 percent load as high as 200 amperes, the shading effect of the "single loop" light load plate becomes quite serious, introducing an objectionable error torque above and beyond the aforementioned error torque inherent in such light load plates.

Accordingly, it is an object of this invention to provide an improved light-load compensating device for an induction watthour meter, one that will achieve the desired correction without introducing an objectionable error torque, and one that is capable of use for both high and low current ratings.

Briefly, the invention comprises, a light-load adjusting device in the form of a stamped and punched electrical conducting plate as heretofore used in the art, but having a configuration quite different from the single loop or single short-circuited turn now in common use. The plate is in the form of three loops, there being one center loop between a pair of outer loops, with the outer loops so arranged that they tend to eliminate the error torque produced by the shading effect of the plate. The three-loop improved plate is mounted in the same manner as the single loop plate, and as it is displaced from the center axis of the meter stator to achieve light load correction, its center loop will increase its shading effect on one side of the current electromagnet and decrease its effect on the other. At the same time, one of the outer loops will have less shading, corresponding to the increase caused by the center loop, and the other outer loop will have more shading, corresponding to the decrease caused by the center loop. The net shading effect is substantially unchanged, thereby providing light-load correction without introducing undesirable error torques.

The objects of the invention, as well as the benefits and advantages to be derived therefrom, will be best understood upon a reference to the detailed description set forth below when taken in conjunction with the drawings annexed hereto, in which.

Figure 1:
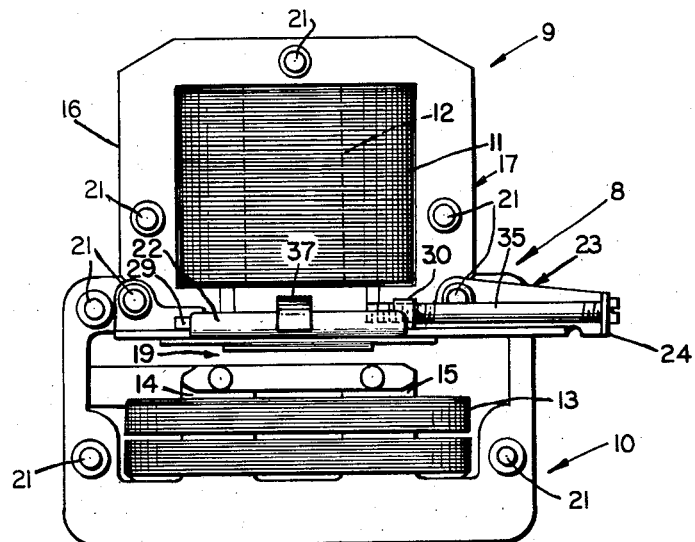
Figure 1 is a front view, in elevation, of an induction watthour meter stator assembly, showing the arrangement of the potential and current electromagnets, with the improved light-load plate in place underneath the potential electromagnet.

Referring now to Figure 1, there is shown a stator assembly 8 of an induction watthour meter comprising the upper potential electromagnet 9 and the lower current electromagnet 10. The potential winding 11 is wound upon a central core 12, and the current winding 13 is wound upon the pair of core members 14, 15. The potential electromagnet has the outer magnetic paths in the form of side legs 16, 17, and these legs, along with the central core 12, are sometimes referred to as an E-shaped potential core. The current cores 14, 15, along with the interconnecting portion of the stator bottom 18, may be referred to as a U-shaped current core. It is to be noted that the stator assembly is symmetrical about its center vertical axis and that there is an air gap 19 separating the potential and current portions of the meter. In this air gap a conventional induction disc (not shown) is journalled for rotation and driven by the torque produced by the fluxes of the respective electromagnets.

The stator may be made up of a plurality of laminated pieces held together by any convenient means, such as the plurality of hollow rivets 21.

Figures 2, 3:
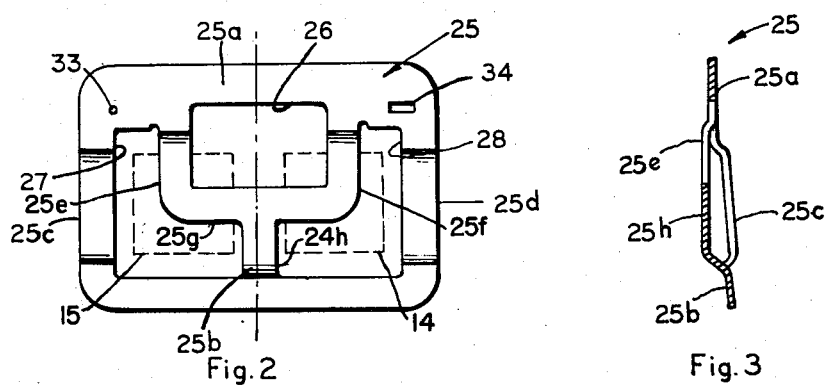
Figure 2 is a top view of one form of the improved light-load plate, the two dotted squares representing the cores of the current electromagnet.
Figure 3 is an end view of the improved light-load plate shown in Figure 2.
Figure 5:
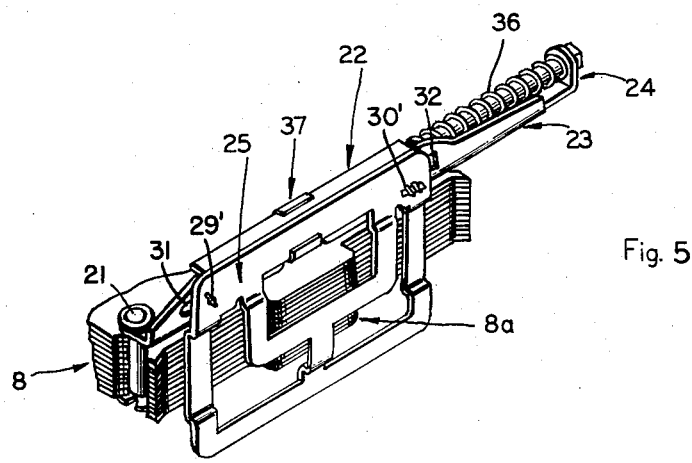
Figure 5 is a partial perspective view of the improved light-load plate as it looks when in place on the meter stator.

Referring now to Figures 1 and 5, there is shown mounted on the stator assembly and secured thereto by a pair of the rivets 21, a bracket 22 having the elongated section 23 provided with the inturned ear 24. Bracket 22 supports the light-load adjusting device, which in the form shown in Figures 1, 2, 3, and 5 comprises an electrically conducting copper plate 25 suitably stamped and punched to form three interconnected conducting loops, sometimes referred to as short-circuited turns, there being an inner loop 26 and a pair of outer loops 27, 28. The plate 25 is substantially rectangular in shape and comprises the outer lengthwise sections 25a and 25b interconnected by the pair of outer transverse sections 25c and 25d and the pair of inner transverse sections 25e and 25f. Interconnecting the inner transverse sections is a third or inner lengthwise section 25g, which forms the inner loop 26 along with sections 25e and 25f and a part of 25a. A common inner transverse section 25h outerconnects the lengthwise sections 25g and 25b. As best shown in Figures 3 and 5, all of the transverse sections of plate 25 are offset with respect to their interconnecting lengthwise sections, the inner and outer transverse sections being offset in opposite directions. This offsetting is done to give proper clearances and assure a good fit to the stator assembly. It is noted that the stator has a slight projection 8a contiguous to the potential core 12 and the offsetting is done primarily to fit the plate around this projection.

The plate 25 is slidably mounted on bracket 22 by means of enlarged rivet 29 and nut 30, both of which have portions of reduced size passing through elongated slots 31, 32, respectively, in bracket 22 and have their ends 29', 30' projecting through the apertures 33, 34, respectively, provided in plate 25 and turned over thereon. The rivet and nut are thus rigidly affixed to plate 25 and together therewith comprise an integral assembly. A substantially C-shaped spring clip 37 partially surrounds portions of both the bracket and plate to thereby aid in holding the parts together.

The nut 30 receives the threaded end of an adjusting bolt 35 which projects through a suitable aperture provided in the inturned ear for that purpose. A fairly stiff spring 36 surrounds that part of bolt 35 between the nut 30 and the ear 24 to hold the parts in position after any necessary adjustments are made (spring 36 is shown in Figure 5, being omitted from Figure 1 for the sake of clarity).

With the parts arranged as described, it is apparent that any rotation of the bolt 35 will cause the plate 25 to slide across the face of the potential electromagnet 9. The parts are so dimensioned that the total possible excursion of the plate is about ⅜ of an inch. Normally, the parts are assembled with the plate 25 centrally in place on the stator. Adjustment in either direction is then possible to provide the necessary light-load correction.

Now considering the plate 25 as having a simple single loop configuration, it could be used as a means of adjusting light-load torque, but it would introduce an objectionable error torque when measuring loads up to 200 amperes, and this error torque would exceed allowable tolerances for the meter. Thus, referring to Figure 7, there is shown a series of curves illustrating the effect on meter registration as a single-loop light-load plate is displaced to either side of its neutral position. The curves were obtained by plotting the average data from three watthour meters equipped with single loop light-load plates and running at 400 percent rated load. The meters used were substantially identical to the so-called type I-50 meters (manufactured and sold by the assignee of the subject invention) as modified to permit the meter to handle current up to 200 amperes. The solid lines represent the normal direction of rotation of the induction disc, whereas the dotted lines illustrate performance when the meter is rotating in a direction reversed from normal. Additionally, the curves at the top of the chart illustrate performance at a load power factor of unity, whereas the curves at the bottom of the chart illustrate performance at a load power factor of 0.5 lagging.

Figure 6:
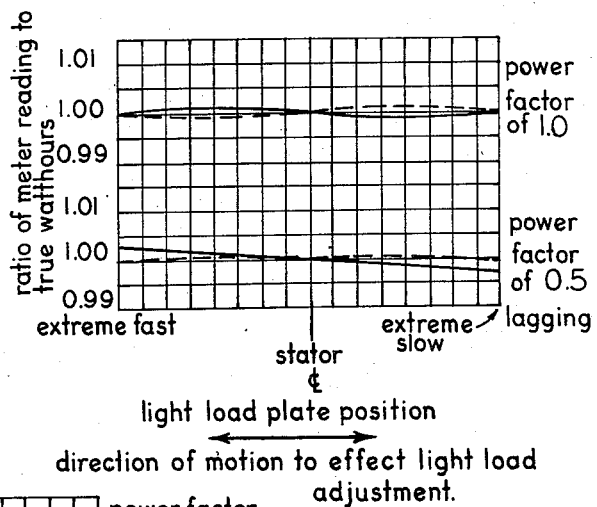
Figure 6 is a chart having a series of curves showing the variations in the ratio of indicated watthours to true watthours, at 400 percent rated load, for all positions of the improved three loop light-load plate, one set of curves corresponding to a measured circuit of unity power factor and one set of curves corresponding to a measured circuit of 0.5 lagging power factor.
Figure 7:
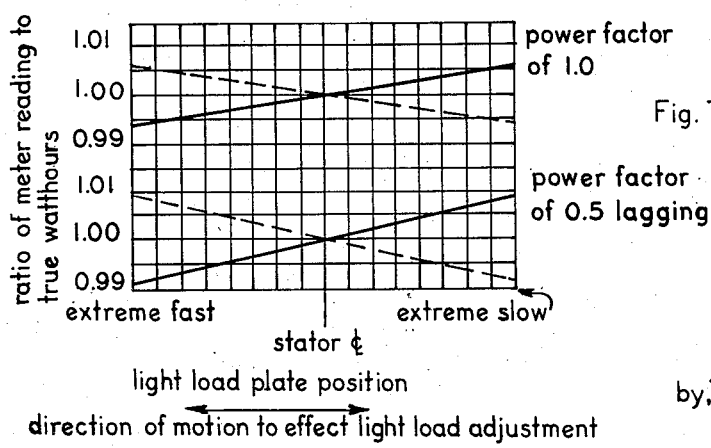
Figure 7 is a chart, identical in all respects with Figure 6, except that the series of curves shows variations in the ratio of indicated watthours to true watthours for a meter equipped with a conventional single loop light-load plate.

It is to be noted that both sets of curves in Figure 7 show the meter to be actually running slow at 400 percent load with the light-load plate set in position to give maximum speed up at light-load. The opposite holds true for those positions of the light-load plate slowing down the meter, for at 400 percent load, the meter speeds up. In Figure 6, the reverse effect appears to be present—that is, with the light-load plate set for meter speed-up at light load, the meter will run fast at 400 percent load, and vice versa.

The curves in Figure 6 are similar to those shown in Figure 7 but were obtained by plotting the average data from the same three watthour meters equipped instead with the novel three-loop light load plate shown in Figure 2. It is to be noted that both Figures 6 and 7 have been corrected for all normal error torques resulting from the light-load effect so that the curves indicate the magnitude of objectionable error torque existing. The curves in Figure 7 show this error to be about one percent for unity power factor and about 2 percent for 0.5 lagging power factor, whereas the curves in Figure 6 show this error torque to be practically nil at either extreme position of the light-load plate, rising to about 0.2 percent at intermediate positions. It is apparent that a sharp reduction in error torque takes place with the substitution of the three-loop light-load plate.

The error torque is substantially eliminated because the shading effect is substantially eliminated with the three-loop construction. With the plate 25 in its neutral or center position, each of the three loops does a certain amount of shading, but because of the symmetrical arrangement of parts there is no net torque produced by the action of the plate. This "net zero" torque is maintained as the plate is shifted either right or left from the center line because any tendency for one part of the plate to change its shading effect is counteracted by equal and opposite changes in another part of the plate.

Figure 4:
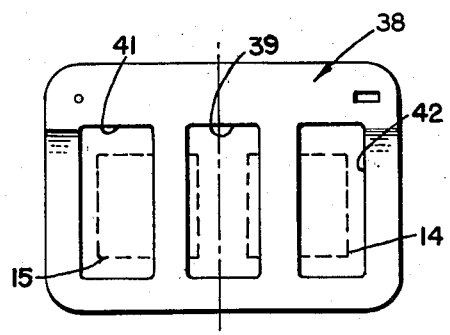
Figure 4 is a top view of another form of the improved light-load plate.

An alternative arrangement for the three-loop plate is shown in Figure 4, wherein the plate 38 has the inner loop 39 and the outer loops 41, 42. The "net zero" torque is achieved with this plate, and it is quite suitable as a light-load compensating device for meters designed to measure current loads up to 200 amperes. However, it has been found that somewhat improved light-load correction is possible with the embodiment shown in Figure 2, primarily because the outer loops 27, 28 can have much more interaction with the potential flux; i. e., all three loops in the plate 25 can contribute to the light-load control achieved through distortion of the potential flux, whereas, in the design shown in Figure 4, the inner loop must be relied upon to do most of the action, thereby losing some of the effectiveness of the design shown in Figure 2. In all other respects, the plate 38 may be similar to the plate 25. Although it has been shown as flat, and not offset as the plate 25, this difference is of no significance when considering the elimination of objectionable error torque resulting from current alone. The offsetting of plate 25 is done primarily for obtaining necessary clearances in the particular meter stator design shown, but it could be eliminated if stator design did not dictate its use.

As to be expected, the stator design has some influencing effect upon the design of the light-load plate, particularly the configuration of the stator in the vicinity of the stator air gap. Slight changes in stator design may require slight changes in the light-load plate, but so long as the basic three-loop arrangement is substantially unchanged, adequate light-load torque correction can be achieved.

From the above, it is apparent that proper light-load correction is achieved through the use of the adjustably positioned three-loop plate. Furthermore, the plate may be fabricated by simple sheet metal processing techniques, thus resulting in an arrangement quite compatible with low manufacturing costs.

Although in accordance with the provisions of the patent statutes this invention is described as embodied in concrete form and the principle thereof has been explained together with the best mode in which it is now contemplated applying that principle, it will be understood that the elements shown and described are merely illustrative and that the invention is not limited thereto since alterations and modifications will readily suggest themselves to persons skilled in the art without departing from the true spirit of this invention or from the scope of the annexed claims.

What I claim as new and desire to secure by Letters Patent of the United States is:

1. An induction watthour meter comprising, in combination: a stator assembly including aligned symmetrically arranged current and potential electromagnets separated by an air gap, said current electromagnet having a pair of core members and said potential electromagnet having a single core member, an induction disc rotor journalled for rotation in said air gap, said disc rotating in response to the flow of electric energy in said electromagnets, and a light load torque correcting device mounted adjacent to said potential electromagnet, said device being adjustable across the face of said potential core member and comprising an electroconductive plate formed into an inner conducting loop between a pair of outer conducting loops, said plate having a central position wherein said loops are substantially symmetrically disposed about the axis of the watthour meter with said conducting loops so disposed that when said plate is in said central position said inner loop shades a portion of each of said current electromagnets, said portions being adjacent the region intermediate the said current electromagnets, said outer conducting loops each shade the remainder of said current electromagnet core members above which they are respectively positioned, and upon adjustment of said plate changes in shading effects of said inner loop are in opposition to the changes in shading effects of each of said outer conducting loops at each current electromagnet core member.

2. An induction watthour meter comprising, in combination: a stator assembly including aligned symmetrically arranged current and potential electromagnets separated by an air gap, said current electromagnet having a pair of core members and said potential electromagnet having a single core member, an induction disc rotor journalled for rotation in said air gap, said disc rotating in response to the flow of electric energy in said electromagnets, and a light load torque correcting device mounted adjacent to said potential electromagnet, said device being adjustable across the face of said potential electromagnet and comprising a plate formed into a centrally disposed electroconductive loop between a pair of outer electroconductive loops, said plate straddling said potential core member and being so positioned that all three loops link at least a portion of the flux generated by said potential electromagnet, said plate having a central position wherein said loops are substantially symmetrically disposed about the axis of the watthour meter with said electroconductive loops so disposed that when said plate is in said central position said centrally disposed loop shades a portion of each of said current electromagnets, said portions being adjacent the region intermediate the said current electromagnets, said outer loops each shade the remainder of said current electromagnetic core members above which they are respectively positioned, and upon adjustment of said plate changes in shading effects of said centrally disposed loops are in opposition to the changes in shading effects of each of said outer loops at each current electromagnet core member.

3. An induction watthour meter comprising, in combination: a stator assembly including aligned symmetrically arranged current and potential electromagnets separated by an air gap, said current electromagnet having a pair of core members and said potential electromagnet having a single core member, an induction disc rotor journalled for rotation in said air gap, said disc rotating in response to the flow of electric energy in said electromagnets, and a slight load torque correcting device mounted underneath said potential electromagnet, said device being adjustable across the face of said potential core member and comprising a rectangular electroconductive plate having a pair of spaced lengthwise members bridged by outer and inner pairs of spaced transverse members whereby three electroconductive loops are formed said three electroconductive loops so disposed as to form an inner conducting loop between a pair of outer conducting loops, said plate having a central position wherein said loops are substantially symmetrically disposed about the axis of the watthour meter with said electroconductive loops so disposed that when said plate is in said central position said inner loop shades a portion of each of said current electromagnets, said portion being adjacent the region intermediate the said current electromagnets, said outer conducting loops each shade the remainder of said current electromagnet core members above which they are respectively positioned, and upon adjustment of said plate changes in shading effects of said inner loop are in opposition to the changes in shading effects of each of said outer conducting loops at each current electromagnet core member.

4. An induction watthour meter comprising, in combination: a stator assembly including aligned symmetrically arranged current and potential electromagnets separated by an air gap, said current electromagnet having a pair of core members and said potential electromagnet having a single core member, an induction disc rotor journalled for rotation in said air gap, said disc rotating in response to the flow of electric energy in said electromagnets, and a light load torque correcting device mounted underneath said potential electromagnet, said device being adjustable across the face of said potential core member and comprising a rectangular electroconductive plate having a pair of outer spaced lengthwise members bridged at their extremities by a pair of outer transverse members, an inner lengthwise member shorter than said outer lengthwise members lying between them and spaced from each, a pair of inner transverse members at the extremities of said inner lengthwise member bridging it with one of said outer lengthwise members, and a third inner transverse member at the center portion of said inner lengthwise member bridging it with the other of said outer lengthwise members.

5. An induction watthour meter comprising, in combination: a stator assembly including aligned symmetrically arranged current and potential electromagnets and an air gap, said potential electromagnet having a central core member, an induction disc journalled for rotation in said air gap, said disc rotating in response to the flow of electric energy in said electromagnets, and a light load torque correcting device adjustably mounted adjacent to said central core member, said device comprising a rectangular electroconducting plate substantially straddling said potential core member and slidable across the face thereof, said plate being in the form of a single loop having its lengthwise members bridged by a Y-shaped member whereby three conducting loops are formed.

References Cited in the file of this patent

UNITED STATES PATENTS

| | | |
|---|---|---|
| 1,180,795 | Pratt | Apr. 25, 1916 |
| 2,146,606 | Trekell | Feb. 7, 1939 |
| 2,328,728 | Leippe | Sept. 7, 1943 |
| 2,512,345 | Leippe | June 20, 1950 |